UNITED STATES PATENT OFFICE.

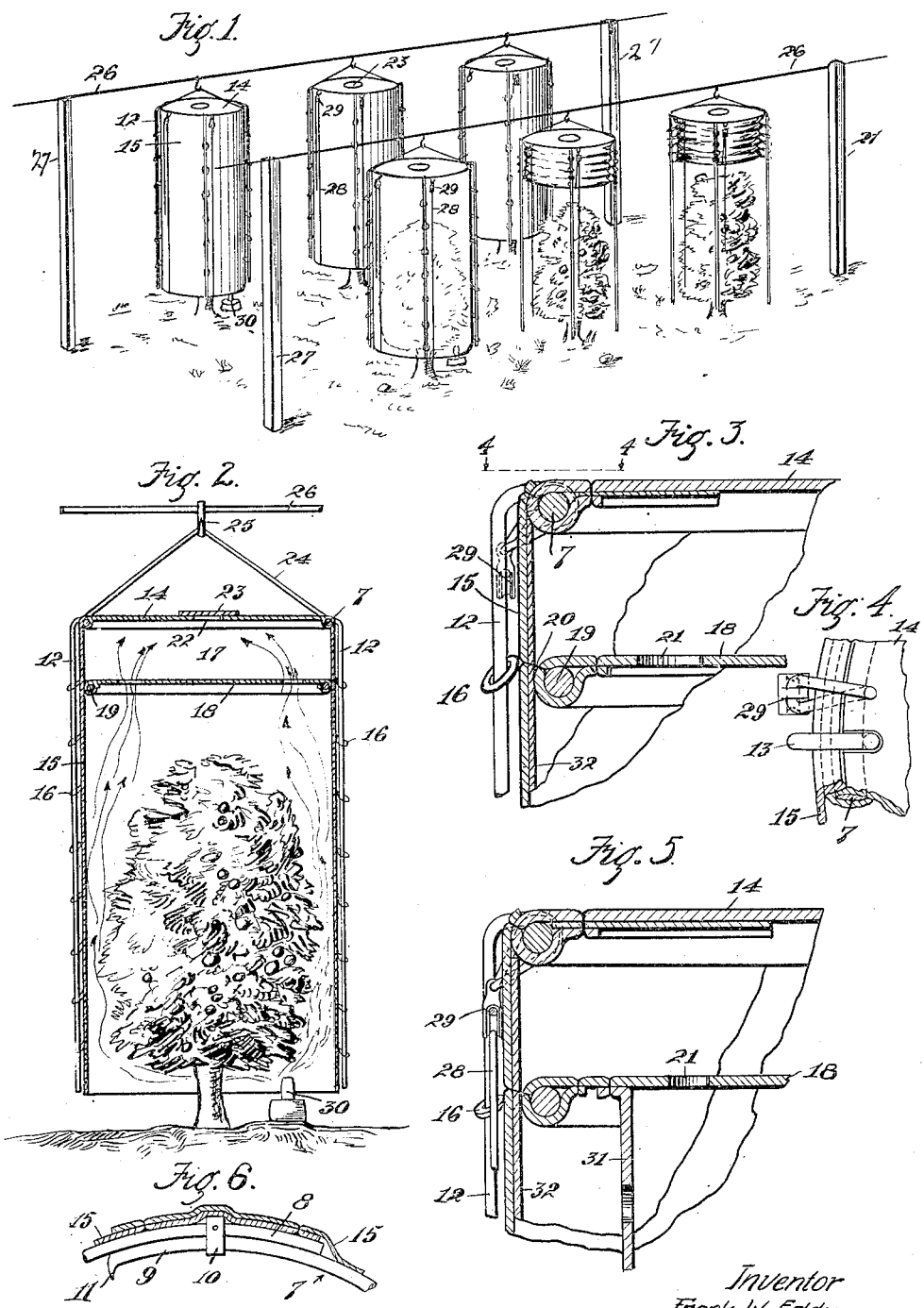

FRANK W. EDDY, OF LOS ANGELES, CALIFORNIA.

PROTECTIVE APPARATUS FOR FRUIT-TREES.

1,126,426.

Specification of Letters Patent.

Patented Jan. 26, 1915.

Application filed December 30, 1913. Serial No. 809,439.

*To all whom it may concern:*

Be it known that I, FRANK W. EDDY, a citizen of the United States, residing at Los Angeles, in the county of Los Angeles, State of California, have invented new and useful Improvements in Protective Apparatus for Fruit-Trees, of which the following is a specification.

This invention relates to protective apparatus for fruit trees, and particularly pertains to a foldable canopy or hood for inclosing fruit trees to protect them from frost.

It is the object of this invention to provide a canopy for inclosing fruit trees, which can be folded when not in use and quickly unfolded and placed in position over and around a tree when occasion demands.

Another object is to provide means by which the hoods can be easily and quickly folded and unfolded.

Another object is to provide a supporting means by which a plurality of hoods can be carried and arranged adjacent the trees in a grove when in use or in readiness for use.

Another object is to provide a tree protecting hood which is capable of being enlarged or reduced in diameter so as to readily fit trees of different sizes.

Another object is to provide a folding hood having a compartment adapted to confine heated air.

In protecting fruit trees from frost it is a common practice to inclose individual trees in tents supported on props or on the trees themselves, or to cover a large number of trees under a canvas roof carried on suitable supports. Devices of this character are objectionable owing to the difficulty in putting them in place and afterward removing them from the trees owing to their size and weight, and are also objectionable in that much time is consumed in covering the trees which renders it practically impossible to cover all the trees in large orchards or groves quick enough to avoid threatened frost without the use of a large force of men and much labor and expense.

The above objections are obviated by providing a foldable canopy or hood which can be quickly lowered into position around a tree when there is danger of frost and which can be quickly removed from the tree when the danger of frost has passed.

The invention primarily resides in a supporting frame, means for suspending same, a fabric hood carried by the frame and manual means for folding and unfolding the hood in relation to the supporting frame.

The invention is illustrated in the accompanying drawings, in which:

Figure 1 is a perspective view showing the application of the invention and showing the canopy both in the open and folded position. Fig. 2 is a vertical section of the canopy. Fig. 3 is an enlarged detail section showing the construction of the upper portion of the canopy. Fig. 4 is a detail in plan on the line 4—4 of Fig. 3. Fig. 5 is a detail section of the upper portion of the canopy showing a modification of construction. Fig. 6 is a detail in plan of the broken ring.

More specifically, 7 indicates a horizontally disposed broken ring with the end portions 8 and 9 thereof over-lapping and slidably secured together by a sleeve 10 affixed to the end portion 8 and slidable on the end portion 9, the latter being upturned at 11 to form a stop to prevent the end members 8 and 9 from being separated. This construction of the ring is provided for the purpose of increasing or decreasing its diameter as occasion may require.

Mounted on the ring 7 and depending therefrom is a series of rods 12, spaced at equi-distances apart around the ring 7. These rods 12 are preferably formed with eyelets 13 which loosely engage the ring 7 to form a pivoted connection between the rods and the ring so that if desired the rods may be turned to lie parallel with the ring for convenience in transportation. The space inclosed by the ring 7 is covered by a sheet of fabric 14 which sheet forms the top of the hood and is sufficiently loose to permit the ring 7 being enlarged to its fullest extent before drawing the sheet 14 taut.

Depending from the ring 7 is a fabric sheet or curtain 15 which is attached at its upper edge to the ring in any suitable manner and forms a flexible continuous wall when the ring 7 is suspended.

The vertical ends of the curtain 15 are designed to overlap at the point of juncture of the end portions 8 and 9 of the broken ring 7; one end of the curtain 15 being unsecured at its upper edge for a suitable distance to permit of the adjustment of the ends 8 and 9 in relation to each other. The curtain 15 is arranged to lie adjacent the inner sides of the depending rods 12 and is secured to the latter by means of a series of rings 16 which are secured to the outer face of the curtain, and are slidable on the rods 12 in such manner that the curtain can be drawn up and folded against the ring 7 as indicated on the right hand side of Fig. 1.

Formed in the upper end of the hood is a hot-air compartment 17. This compartment is formed by means of a fabric partition 18 supported on a ring 19 and secured to the inner wall of the curtain 15 by stitching 20 or in any other suitable manner. The partition 18 is spaced a suitable distance from the top or cover 14 and is formed with apertures 21 for the passage of heat therethrough; a vent 22 normally closed by a draft regulating plate 23, being formed in the top 14 to vent the chamber 17 when desired.

The hood carrying ring 7 is suspended by means of a bail 24 from a hook 25 on a cable 26 which cable extends lengthwise of a row of trees some distance thereabove and is supported upon posts 27 as illustrated in Fig. 1, a hood being suspended immediately above each tree or slidably arranged on the cable 26 so as to be moved into position over a tree.

Means are provided for manually folding and unfolding the fabric side-walls of the hood, which means comprises cords 28 which are secured to the lower edge of the side-walls 15 of the hood and pass upward and over pulleys 29 carried by the ring 7 adjacent the rods 12, which cords extend downward from the pulleys to a point convenient of reach.

In the application of the invention, when it is desired to encompass a tree by the hood, the latter being previously disposed in its folded position and retained therein by suitably fastening the outer ends of the cords 28 to fixed supports which may be on the tree itself, the cords 28 are loosened so as to allow the folded curtain 15 to gravitate downward and encircle a tree. This operation can be very quickly performed. A heater 30 of any suitable description may be placed beneath the canopy and tree as shown in Fig. 2 to supply heat if desired, which heat will rise around the tree and be confined by the walls 15 of the canopy and will enter the compartment 17 where it will be prevented from being deflected downward around the tree by the top of the hood, the vent 22 being opened to any desired extent by adjusting the plate 23 to obtain the required draft.

If desired, the side-walls of the canopy may be formed double by suspending a continuous flexible partition wall 31 from the horizontal partition 18 as shown in Fig. 5, the lower edge of the partition 31 being connected with the lower edge of the side walls 15 of the hood so as to fold and unfold therewith.

When it is desired to raise the hood clear of the tree the curtain 15 is folded against the underside of the ring 7, or partially folded as desired, by pulling on the free ends of the cords 28, the latter being afterward fastened to retain the hood in its folded position.

To prevent excessive radiation of the heat and cold through the walls of the hood, the fabric curtains 15 and the top 14 are lined with paper or other suitable non-conductive material 32.

From the foregoing it will be seen that I have provided a protective hood for fruit trees which can be readily placed in position around a tree at night when danger of frost is greatest, and raised in the morning when danger of frost is past so as to expose the tree to the air and sun, and which hood will not be displaced by moderate winds.

What I claim is:

1. In a canopy for trees, a suspended ring, rods pivotally depending therefrom, a flexible wall carried by the ring and depending therefrom adapted to encircle a tree, slidable connections between said wall and the rods, means for sliding the flexible walls vertically on said rods to dispose them in a folded position against the ring, or in an unfolded position to form an inclosure for a tree.

2. In a canopy for protecting fruit trees, a ring capable of being reduced or enlarged, a cover carried by the ring inclosing the space encircled thereby, a flexible curtain attached to the ring and depending therefrom to form tree encircling walls, guide rods carried by the ring and pivoted thereon, slidable connections between the curtain and said rods, and manually operated means for raising the curtain to fold it against the ring and for lowering it into operative position around a tree.

3. A protective hood for trees, comprising foldable fabric side walls closed at their top and adapted to encompass a tree, a foldable frame carrying the fabric, means for supporting the frame in a dependent position, a partition wall dividing the space inclosed by the fabric side walls into compartments, said partition wall having apertures for the passage of air therethrough.

4. A protective hood for trees, comprising foldable fabric side-walls closed at their top and adapted to encompass a tree, a foldable frame carrying the fabric, means for supporting the frame in a dependent position, a partition wall dividing the space inclosed by the fabric side walls into compartments, said partition wall having apertures for the passage of air therethrough, and manually operated means for folding and unfolding the fabric side-walls in relation to the canopy frame.

5. A canopy for fruit trees, comprising a ring, a cover carried by the ring inclosing the top of the canopy, a flexible curtain attached to the ring and depending therefrom to form tree encircling walls, a second ring secured within the curtain and spaced below the first-named ring, a fabric wall formed with apertures carried by said second ring, a series of foldable guide rods carried by the first-named ring, and slidable connections between the curtain and said rods.

In witness that I claim the foregoing I have hereunto subscribed my name this 17th day of December, 1913.

FRANK W. EDDY.

Witnesses:
EDMUND A. STRAUSE,
MARIE BATTEY.

Copies of this patent may be obtained for five cents each, by addressing the "Commissioner of Patents, Washington, D. C."